Oct. 13, 1964

P. S. MUNN ETAL
LEAKAGE DETECTION FOR SEALS IN SUBMERSIBLE
ELECTRIC EQUIPMENT
Filed Jan. 10, 1962

3,152,472

INVENTOR.
PAUL S. MUNN
CHARLES KENNETH HUTCHINS JR.
KENNETH R. WOODWARD
BY
*Adams, Forward and McLean*
ATTORNEYS

United States Patent Office 3,152,472
Patented Oct. 13, 1964

3,152,472
LEAKAGE DETECTION FOR SEALS IN SUB-
MERSIBLE ELECTRIC EQUIPMENT
Paul S. Munn, Melrose, Mass., and Charles K. Hutchins,
Jr., Greenland, and Kenneth R. Woodward, New Castle, N.H., assignors to Simplex Wire and Cable Company, Cambridge, Mass., a corporation of Massachusetts
Filed Jan. 10, 1962, Ser. No. 165,345
3 Claims. (Cl. 73—46)

Our invention relates to leakage detection and in particular provides a leakage detector having particular applicability to the detection of leaks past sealing surfaces.

In deep-sea communication cables it is necessary periodically to provide repeaters and sometimes other electronic equipment which must be electrically connected to the cable. Since the reliability of the operation of the cable depends upon the reliability of such equipment and as retrieving faulty equipment is a costly process, the construction of seals at the connection of the cable with the repeater or other device is highly refined science. A significant problem lies in the fact, however, that should a seal be imperfect and permit moisture leakage into the repeater housing, the entire cable service could be interrupted until the particular repeater having the leaky seal is located, retrieved and replaced.

It is therefore the primary object of our invention to provide a moisture leakage detector for detecting leakage at joints between repeaters and deep-sea cable during factory testing prior to laying.

While such is the primary object of our invention it will be apparent that the leakage detector provided by our invention has general applicability to the detection of leaks of any material past any pair of sealing surfaces.

It is a further object of our invention to provide a leakage detector which will detect such leakage and indicate its presence remotely, since once a repeater has been sealed, reopening the repeater, as for example, for visual examination of the detector, would destroy the seal and make any such examination meaningless, as the seal so tested would no longer exist.

It is a still further object of our invention to provide a leakage detector which can integrally be built into the parts forming the joint between the cable and the repeater housing. In this way, a minimum amount of space is used, a particularly important consideration in the design of a miniaturized repeater housing. Also, since such a leakage detector would be in a close proximity to the seal, such leakage can be detected at once before it can enter the repeater chamber housing the electronic components.

Basically, the leakage detector of our invention utilizes a passageway, preferably located within the cable entrance gland, which communicates with the interior portions of the sealing surfaces, and a flexible diaphragm, which closes off the passageway. A secondary seal is provided to trap the leakage within the passageway so that the influx of leakage into such passageway will cause an increase of pressure within the passageway. Such pressure increase will cause the diaphragm to distend. A device is provided responsive to such motion which will remotely indicate this motion, and hence, leakage. While we contemplate detection of leakage into a repeater, it will be apparent the same construction is equally capable of detecting leakage out of a device, as a loss of pressure in the passageway would also cause the diaphragm to distend.

In a preferred embodiment of our invention, a composition which is reactive to the substance to be detected is placed within the passageway to increase the pressure generated within the passageway by virtue of such reaction, and thus enhance the sensitivity of the leakage detector.

It is also a secondary object of our invetinon in connection with its employment in electric cables to provide an arrangement by which movement of the diaphragm is sensed electrically through the cable itself and which after factory testing for leakage can be disabled in a manner not interfering with subsequent use of the conductors of the cable. Thus, no additional electrical conductors need be brought through the cable seal for the limited purpose of measuring leakage.

This secondary object of our invention is basically obtained by using a frangible, electrically conductive element affixed to the surface of the diaphragm, as the device which responds to movement of the diaphragm, and by connecting it in series with a fuse between a conductor of the cable and ground. Thus after factory testing, if the circuit through the frangible element remains unbroken, thereby indicating the seal to be water-tight, the detector is disabled by placing sufficient potential between the conductor and ground to blow the fuse.

For a more complete understanding of the practical application of our invention, reference is made to the appended drawings in which.

Figure 1:
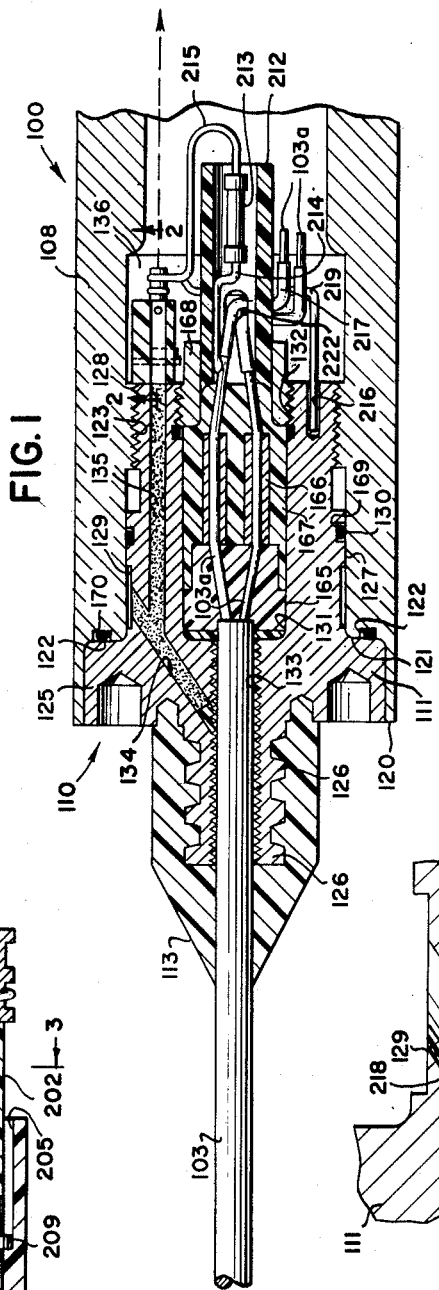
FIGURE 1 is a longitudinal section of a seal between a two conductor deep-sea armorless cable and a repeater housing in which the seal is provided with a moisture leakage detector in accordance with our invention.

Referring to FIGURE 1 the reference numeral 110 indicates generally the seal between a tube 108 housing a repeater (not shown) and a two conductor, deep-sea, armorless cable 103.

Fundamentally, the seal includes a plug 111 in tube 108, which plug is provided with an axial bore receiving cable 103, and a resilient seal 113 over the opening in which cable 103 enters plug 111. More specifically, it will be noted that the end of tube 108, designated by the reference numeral 120, is interiorly, annularly recessed to define a seat 121 facing outward at end 120. It will be further noted that seat 121 itself is provided with a small annular groove 122 in its surface facing end 120 of tube 108. Spaced a short distance further within tube 108, the tube is provided with an internal, annular, threaded boss 123.

Plug 111 is of generally cylindrical shape having a centrally positioned exterior flange 125 which forms a shoulder shaped to abut snugly against seat 121. Plug 111 has a greatly reduced diameter on the side of flange 125 opposite that which abuts seat 122 and is provided with a series of annular flanges 126 spaced from each other with their confronting faces tapering slightly toward each other such that in section the notch between each pair of adjacent flanges 126, 126 has the shape of a flat-bottomed V. As can be seen in FIGURE 1, flanges 126 form a castellated gland.

On the opposite side of plug 111, which shoulder 125 faces, immediately adjacent the shoulder, i.e., flange 125, plug 111 has a cylindrical portion 127 having a diameter equal to the inside diameter of tube 108 immediately inward of seat 121. The end of plug 111 which is faced by shoulder 125 has a somewhat reduced diameter and is threaded, as indicated by the reference number 128, the threads being positioned and sized to be received by threaded boss 123 when shoulder 125 abuts seat 121. The cylindrical portion 127 of plug 111 is further provided with a shallow, annular groove 129 immediately adjacent shoulder 125 and is provided with a small annular groove 130 more remote from shoulder 125.

Interiorly beneath threaded end 128 plug 111 is provided with a large diameter axial bore 131 which is threaded adjacent beneath threaded end 128 of plug 111, as indicated by the reference numeral 132. The other end of plug 111 is provided with a tapped axial bore 133 which leads to bore 131 and which has a smaller diameter than bore 131 approximately equal to the outside diameter of cable 103.

A passageway 134 is formed in plug 111 extending between the bottom of groove 129 and tapped bore 133 near its inner end, and a passageway 135 is provided in plug 111 parallel to the axis of plug 111 extending from a point communicating with passageway 134 to the end face of threaded end 128 of plug 111.

Seal 113 is constructed of resilient dielectric material and is molded about the castellated portion of plug 111, as will be later described, and hence conforms interiorly to the shape over which it is molded. Exteriorly seal 113 is of cylindrical shape through its portion overlying flanges 126 and then tapers down to the insulation of cable 103.

In assembling seal 110 the end of a cable, such as cable 103, is extended through tapped bore 133 and then through bore 131. The conductors 103a of cable 103 thereafter are exposed by removing a section of the insulation at the end of cable 103 extending out through bore 131.

A solid plug 165 of nylon or similar dielectric material having a pair of lengthwise bores sized to receive the conductors 103a and transversely dimensioned to fit inside the inner end of bore 131 is then slipped over the bared ends of conductors 103a up to a position abutting the end of the insulation of cable 103. Preferably the spacing of the bores through plug 165 at its end which abuts the insulation of cable 103 is equal to the spacing of conductors 103a in cable 103. Plug 165 can also be apertured to receive a portion of the abutting insulation of cable 103.

Small copper sleeves 166 are then slipped over the ends of conductors 103a down to a position abutting plug 165 where sleeves 166 are crimped tightly over conductors 103a to secure them in position. A sleeve 167 of suitable dielectric material, such as nylon, which has an outside diameter equal to the inside diameter of bore 131 and which is closed at one end and inwardly recessed to receive the ends of sleeves 166 is then extended over such sleeves 166. Conductors 103a pass through suitable apertures in the closed end of sleeve 167 which reaches a position with its open end positioned about plug 165 which is provided with an exterior end recess to receive sleeve 167. At such position copper sleeves 166 are snugly held between plug 165 and the closed end of sleeve 167.

This assembly is then inserted into bore 131 in which it is snugly received while drawing lightly on cable 103 to remove any slack within plug 111. A short length of tubing 168 which is exteriorly threaded at one end to be received on threads 132 is then positioned in bore 131 and tightened down on threads 132 to abut against the closed end of sleeve 167 and secure the assembly.

Figure 4:
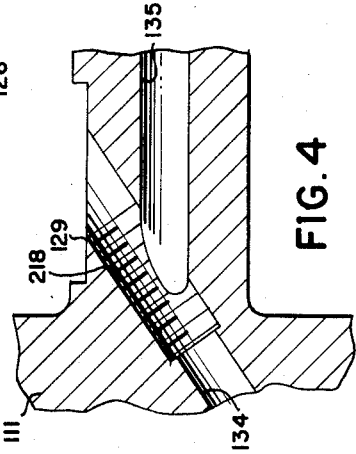
FIGURE 4 is an enlarged fragmentary longitudinal section of another portion of the apparatus shown in FIGURE 1.

Referring more particularly to FIGURE 4 which shows the joint between passageways 134 and 135, it will be noted that at the joint and up through the bottom of groove 129 passageway 134 is tapped, as indicated by the reference numeral 218. Passageway 134 is closed by engaging a screw in the tapped portion 218 of passageway 134. Preferably the screw has a smooth, cylindrical point sized to close the lower end of passageway 134.

Plug 111 including the castellated gland formed by flanges 126, is then mounted in a mold which is suitably constructed to permit cable 103 to extend out of the cavity, the cavity being defined about the castellated gland and a short length of cable 103. The cavity is shaped in the form of a cylinder of somewhat smaller diameter than flange 125 which overlies the castellated gland of plug 111 and which terminates in a conical portion which overlies the exposed cable 103, the base of the conical portion being adjacent to the end of and having the same diameter as the cylindrical portion of the cavity, and the apex of the conical portion being at the aperture through which cable 103 extends from the mold.

A suitable, normally solid, dielectric resin is then heated and rendered fluent and thereafter injected into the cavity in the mold to fill the cavity about the castellated gland on closure member 111 and the section of cable 103 in the cavity. Preferably cable 103 is insulated with polyethylene, and preferably in such case the dielectric material injected into the cavity is the same. Preferably the injection pressures and tolerances are such that the injected material will travel up bore 133 about cable 103 up to plug 165 forming a slight flashing at the end of plug 165 in bore 131. Preferably the temperature of the material injected and time before cooling of the injected material to solid state is sufficient to cause fusion of seal 113 formed of the injected material with the insulation of cable 103. Preferably the surfaces of plug 111 exposed within the cavity of the mold are treated with a suitable bonding agent to obtain maximum adherence of seal 113 about closure 111. After completing the molding of seal 113 the screw in passageway 134 is removed. On a preferred assembly, passageways 134 and 135 are now filled with a reactive composition, such as calcium carbide.

Figure 3:
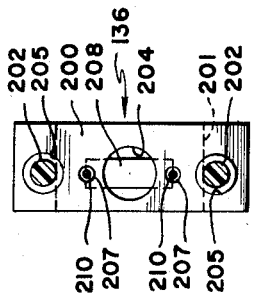
FIGURE 3 is a view taken at line 3—3 in FIGURE 2.
Figure 2:
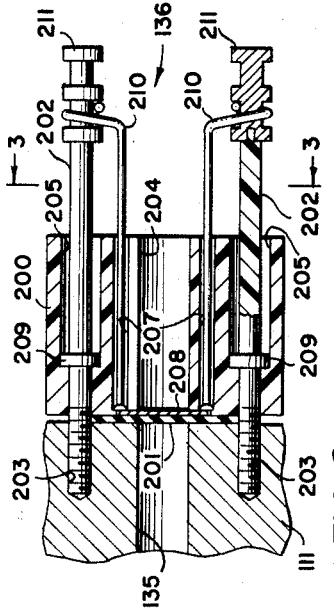
FIGURE 2 is an enlarged fragmentary section taken approximately at line 2—2 in FIGURE 1.

Referring more particularly to FIGURES 2 and 3 the moisture detector of our invention, as indicated by the reference numeral 136, is then installed on the threaded end 128 of plug 111. The detector basically includes a block 200 of hard dielectric material, such as polystyrene, a thin diaphragm 201 of rubber or other flexible dielectric material and a pair of insulated terminal posts 202, 202.

Adjacent the opening of passageway 135 into the end face of plug 111 at its threaded end 128 the end face of plug 111 is provided with a pair of tapped bores 203, 203. Block 200 is centrally provided with a large bore 204 having a diameter equal to that of passageway 135 and is further provided with a pair of bores 205, 205 on each side of its central bore 204 which register with tapped bores 203 in plug 111 when bore 204 is positioned to register with passageway 135. Block 200 is further provided with a second pair of bores 207, 207, one on each side of bore 204 and parallel to it.

Diaphragm 201 has a length equal to the spacing between tapped bores 203, and a width equal to the width of block 200. Diaphragm 201 is cemented to plug 111 in a position such that it covers the end of passageway 135 and is located centrally between tapped bores 203. A strip of electrically conductive metallic foil 208 having a length equal to the center spacing of bores 207 is then placed over diaphragm 201, so that foil 208 is positioned centrally over passageway 135 and extends lengthwise along a line between tapped bores 203.

Block 200 is then positioned over passageway 135, diaphragm 201, and foil 208 in such a way that bore 204 is aligned with passageway 135 and bores 205 are aligned with bores 203. Terminal posts 202, which are threaded at one set of ends, are then inserted, threaded ends first, into bores 205, straddling diaphragm 201, and are threadedly engaged in bores 203 to secure block 200 against plug 111. It will be noted that terminal posts 202 are provided with collets 209 affixed to them to hold block 200 and that bores 205 are counterbored to receive collets 209. It will also be noted that terminal posts 202 are constructed of metal at thier threaded ends, a dielectric material at their non-threaded ends, and are provided with brass caps 211.

Two small bare wires 210 are then secured mechanically and electrically, each to a cap 211. The opposite ends of wires 210 are each inserted into a bore 207 until they contact the opposite ends of foil strip 208. Electrically conductive cement is then introduced into bores 207 to hold the wires 210 in good electrical contact with the ends of foil strip 208.

A pigtail type fuse 213 having two axially mounted leads 214 and 215 is then secured electrically to one of the conductors 103a close to where the conductor emerges from sleeve 167, by attaching and soldering one lead 214, to conductor 103a. Small flexible insulating sleeves 217 are positioned over conductors 103a where they extend from sleeve 167. A sleeve 212 of hard dielectric material, such as polystyrene, having an outside diameter equal to the inside diameter of tube 168, and having a longitudinal slot 222 in one end, is slid over fuse 213, slotted end first. Sleeve 212 is inserted into tube 168 in such a way that fuse 213 is positioned completely within sleeve 212 with its other lead 215 extending through the open unslotted end of sleeve 212, and with conductors 103a extending out through slot 222. The sleeve 212 is then cemented to tube 168. The fuse lead 215 is bent over the unslotted end of sleeve 212 and secured electrically to one of the caps 211 on posts 202. A wire 219 is secured at one end to the other cap 211 with a conducting connection and its other end is inserted in a narrow bore 216 in the end face of plug 111 in which it is brazed, thus making a ground connection to plug 111 which is constructed of stainless steel or similar metal.

Figure 6:
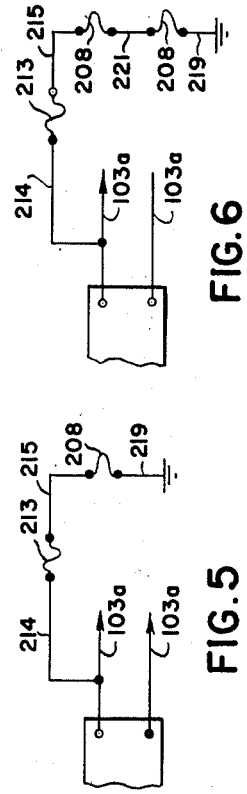
FIGURE 6 is another schematic electrical diagram.

Alternately, as shown in FIGURE 6, wire 219 can be omitted and in its place an insulated wire 221 can be secured to cap 211 and extended to a corresponding cap 211 of a leakage detector 136 located at the opposite end of tube 108 (right end in the portion of FIGURE 1), in which the fuse 213 and sleeve 212 have been omitted. With this arrangement, wire 221 replaces lead 215 at the right end of tube 108 to form a series circuit between conductor 103a and ground. Such a circuit consists of lead 214, fuse 213, lead 215, wires 210, foil strip 208, wire 221, and the corresponding wires 210, foil strip 208, and wire 219 of the second leakage detector 136.

In installing a plug 111, into which a leakage detector 136 has been built, in the end of tube 108 housing an electrical repeater, a neoprene O-ring 169 is placed in groove 130 and a neoprene O-ring 170 is placed in groove 122. O-rings 169 and 170 are generally sized to fit in their respective grooves 130 and 122 projecting slightly above the surfaces in which such grooves are cut. Conductors 103a are then electrically connected to the repeater which previously has been installed within tube 108. Plug 111 is then inserted into end 120 of tube 108 with threaded portion 128 entering into end 120 first. Plug 111 is rotated to engage threads 123 and 128 until flange 125 abuts seat 121 and O-rings 169 and 170 are tightly compressed in their respective grooves 130 and 122.

Typically tube 108 will be similarly closed at its other end and the entire device including lengths of cable 103 is then immersed in water contained in a pressurable tank. In the illustrated case the cable and repeater are designed for service at approximately 3000 fathoms and hydrostatic test pressures on the order of 8000 to 10,000 p.s.i. are accordingly employed for testing. In the illustrated case it will be noted that any moisture leakage occurring during testing would be presumably about the castellated gland through tapped bore 133 or between seat 121 and flange 125. In either case such moisture will be trapped either in groove 129 or in passageway 134 and thus communicating with the calcium carbide in passageways 134 and 135 producing the well-known reaction yielding acetylene gas. In the illustrated case the presence of one milligram of moisture will produce sufficient gas pressure to distend diaphragm 201 outwardly a sufficient amount to cause rupture of foil strip 208. It will be seen that such gas pressure is retained within passageways 134, 135 by the O-ring 169 and by the flashing produced in bore 131 between threaded bore 133 and plug 165 by the molding operation.

Figure 5:
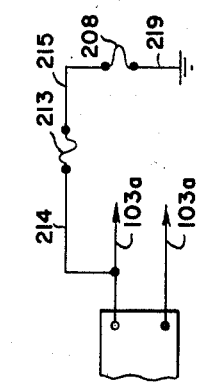
FIGURE 5 is a schematic electrical diagram.

Subsequent to emersion from the test tank the conductor 103a which is connected to moisture detector 136 is then checked for presence of a circuit to ground. As can be seen referring to FIGURE 5 if diaphragm 201 had distened, consequent breaking of element 208 would break the circuit between conductor 103a and ground. The presence or absence of such a circuit is, therefore, the indication of the absence or presence of leakage.

It will be noted that the particular cable 103 is an armorless cable. In its intended usage neither conductor 103a should be grounded. Hence the detector circuit must be destroyed before the cable and repeater can be put in service. This is accomplished simply by employing a voltage on the detector circuit sufficient to blow fuse 213, thereby disabling the detector circuit. Obviously fuse 213 need not require a great deal of current to blow it, since the detector circuit will provide adequate indication that the circuit is complete with a few microamperes current, and hence fuse 213 can be selected to blow at a current that will in no way damage the repeater.

We claim:

1. In the combination of an insulated conductor and an electric device connected thereto, which device includes a housing therefor within which said device is located and through a portion of which said conductor is extended with a surface of said housing in contact about the surface of said conductor defining a seal between said insulated conductor and said housing, the improvement which includes a leakage detector for said seal including (a) a passageway in said housing communicating with an interior portion of the surface thereof in contact about said insulated conductor at the seal therebetween,
   (b) a thin, flexible diaphragm sealed across said passageway thereby to enclose a space in said passageway between said seal and said diaphragm,
   (c) a flexible, frangible, electrically conductive element affixed to the surface of said diaphragm,
   (d) a fusible element positioned within said housing, and
   (e) means providing electrical connection between the interior of said housing and the exterior thereof,
   (f) said frangible element and said fusible element being electrically connected within said housing in series between said last named means and said conductor.

2. The improvement according to claim 1 which further includes (a) a composition in said space in said passageway reactive with the substance said seal is intended to exclude to change the pressure in said space.

3. The method of testing a seal between an insulated conductor and an electric device connected thereto, which device includes a housing therefor within which said device is located and through a portion of which said conductor is extended with a surface of said housing in contact about the surface of said conductor defining a seal between said insulated conductor and said housing, and a leakage detector for said seal including a passageway in said housing communicating with an interior portion of the surface thereof in contact about said insulated conductor at the seal therebetween, a thin, flexible diaphragm sealed across said passageway thereby to enclose a space in said passageway between said seal and said diaphragm, a flexible, frangible, electrically conductive element affixed to the surface of said diaphragm, a fusible element positioned within said housing and means providing electrical connection between the interior of said housing and the exterior thereof, said frangible element and said fusible element being electrically connected within said housing in series between said last named means and said conductor, which method includes (a) immersing in water a length of said insulated conductor including said device connected thereto and applying pressure to the water, whereby any leakage through said seal is trapped in said passageway increasing the pressure therein to distend said diaphragm and to rupture said frangible element, (b) thereafter checking the continuity of the electrical connection between said insulated conductor and said last named means, and (c) subsequently applying sufficient potential between said conductor and said last named means to blow said fusible element.

References Cited in the file of this patent

UNITED STATES PATENTS

| | | |
|---|---|---|
| 1,775,028 | Hilliard | Sept. 2, 1930 |
| 1,976,752 | Stanworth | Oct. 16, 1934 |
| 2,769,395 | Olson | Nov. 6, 1956 |

FOREIGN PATENTS

| | | |
|---|---|---|
| 1,204,791 | France | Aug. 10, 1959 |